United States Patent [19]

Grau et al.

[11] Patent Number: 4,842,896

[45] Date of Patent: Jun. 27, 1989

[54] PRODUCTION OF MAGNETIC RECORDING MEDIA

[75] Inventors: Werner Grau, Bobenheim-Roxheim; Albert Kohl, Laumersheim; Jenoe Kovacs, Hessheim; Werner Balz, Limburgerhof; Wulf Muenzer, Frankenthal, all of Fed. Rep. of Germany

[73] Assignee: BASF Aktiengesellschaft, Ludwigshafen, Fed. Rep. of Germany

[21] Appl. No.: 99,624

[22] Filed: Sep. 22, 1987

Related U.S. Application Data

[63] Continuation of Ser. No. 878,219, Jun. 23, 1986, abandoned.

[30] Foreign Application Priority Data

Jun. 25, 1985 [DE] Fed. Rep. of Germany ....... 3522681

[51] Int. Cl.$^4$ ................................................ B05D 5/12
[52] U.S. Cl. ................................... 427/131; 428/900
[58] Field of Search ............................... 427/127–132, 427/48; 428/900, 694

[56] References Cited

U.S. PATENT DOCUMENTS

| 3,476,596 | 11/1969 | Carroll | 117/239 |
|---|---|---|---|
| 4,423,452 | 12/1983 | Kajimoto et al. | 360/131 |

FOREIGN PATENT DOCUMENTS

| 1572438 | 4/1965 | Fed. Rep. of Germany. | |
|---|---|---|---|
| 1953459 | 11/1970 | Fed. Rep. of Germany. | |
| 3128004 | 1/1982 | Fed. Rep. of Germany. | |
| 3328719 | 2/1984 | Fed. Rep. of Germany | 5/68 |
| 1260873 | 1/1972 | United Kingdom | 5/70 |

OTHER PUBLICATIONS

Friedman et al, IBM Tech. Dis. Bull., vol. 9, No. 7, 12–66, Lubricants for Magnetic Recording Media p. 779.

Primary Examiner—Bernard Pianalto
Attorney, Agent, or Firm—Keil & Weinkauf

[57] ABSTRACT

Magnetic recording media, consisting of a non-magnetic base and a magnetic layer firmly bonded thereto, exhibit improved properties in sustained operation if, in the course of their production, a dispersion of inorganic particles in a solvent is applied to the magnetic layer, and the solvent is then removed.

3 Claims, No Drawings

PRODUCTION OF MAGNETIC RECORDING MEDIA

This application is a continuation of application Ser. No. 878,219, filed on June 23, 1986 now abandoned.

The present invention relates to a process for the production of magnetic recording media having improved properties in sustained use.

During the recording and playback of signals by means of magnetic recording media which are transported past the magnetic head in contact therewith, as well as over tape guide rollers or other guide elements, very high frictional forces may occur, depending on the composition of the layer. Moreover, the wear which occurs when such recording media are used presents problems not only with regard to their durability but also with respect to their operational reliability. It is therefore usual to add lubricants to the magnetic dispersions used in the production of magnetic recording media. A large number of different lubricants, such as polydimethylsiloxanes, liquid paraffins, waxes, saturated and unsaturated fatty acids, fatty esters, fatty amides and salts of fatty acids, as well as solid lubricants, such as molybdenum sulfide, graphite, polytetrafluoroethylene powder and polytrichlorofluoroethylene powder, have been described as suitable lubricants for this purpose. It has also been stated that, compared with the solid lubricants, liquid or pasty lubricants have the advantage that they cover the surfaces, to the lubricated, with a thin uniform film; the amount of lubricant added must be kept very small since otherwise the surface readily becomes tacky. However, these liquid lubricants frequently cannot be used as the sole lubricant and are therefore combined with solid or pasty lubricants. When liquid lubricants are used exclusively, sticking or blocking of the tapes cannot be permanently avoided in many fields of use, particularly in the case of sustained operation and under unfavorable climatic conditions. It has also been suggested that thin overlay coatings containing materials which possess good antifriction properties be applied to the surfaces of the magnetic layers. However, these have the disadvantage that, in order to keep the distance between the medium and head as small as possible, they have to be very thin and are therefore worn away rapidly by the magnetic heads and hence lose their efficacy, and furthermore soil the heads. In order to overcome this disadvantage, it has also been suggested (German Published Application DAS No. 1,572,438) that a coating containing molybdenum disulfide and graphite powder has been applied to the magnetic layer. However, there is a loss in recording effectiveness in this case too. In the course of further efforts to improve the abrasion properties of magnetic layers, the incorporation of, in general, spherical, non-magnetic hard particles into the magnetic layer has been disclosed (German Laid-Open Applications DOS Nos. 3,128,004, DOS 3,328,719, etc.).

The spherical substances are randomly distributed and are therefore also located at the surface of the magnetic layer and thus protect it against abrasion by the recording and playback heads. However, since these non-magnetic substances are dispersed throughout the magnetic layer, they reduce the residual induction of the tape and increase the background noise. This results in a deterioration in the properties of the tape when it is used for audio, video or data recording purposes. In order to keep the loss of residual induction as small as possible, an attempt has also been made (German Laid-Open Application DOS No. 1,953,459) to incorporate the abrasive substances only in the uppermost layer of the magnetic coating. For certain applications for example video recording, it is precisely this thin outer layer which plays a decisive role with regard to picture quality, so that small losses of residual induction are sufficient to produce a substantial deterioration in the S/N values.

It is an object of the present invention to provide a process which brings about an improvement in the abrasion properties and durability of magnetic recording layers while avoiding the above disadvantages, such as the reduction in the residual induction, the loss in recording effectiveness and the tendency to form smeary deposits.

We have found that this object is achieved, in a surprisingly simple manner, if a dispersion of inorganic particles having a particle size of from 0.01 to 3.0 $\mu$m in a solvent is applied to the surface of the magnetic layer of the magnetic recording medium, and the solvent is then removed, the concentration of the inorganic particles in the dispersion being from 0.02 to 0.25 part by weight, based on the solvent.

The dispersion of inorganic particles in a volatile solvent which is applied, by the novel process, to the surface of the recording layer of a conventional recording medium consisting of a non-magnetic base and a magnetic layer firmly bonded thereto is produced in a conventional manner. Particularly suitable inorganic particles have a particle size of from 0.01 to 3.0 $\mu$m, preferably from 0.02 to 2.0 $\mu$m, are spherical or in the form of short needles and have a Mohs' hardness of at least 5. For example, particles consisting of calcium carbonate, alumina, chromium oxide, zirconium oxide, silica, titanium dioxide or a silicate are suitable for this purpose.

To prepare the dispersion, these particles are dispersed in the solvent in a conventional dispersing apparatus, such as a ball mill, a stirred ball mill or a pebble mill. The concentration of the particles is from 0.02 to 0.25%, preferably from 0.03 to 0.1%, based on the amount of solvent. Adequate dispersion of the particles is generally achieved in the course of from 2 to 5 hours.

Suitable solvents are organic solvents and water. The solvents used should have a low surface tension with respect to the magnetic layer so that they spread completely over the latter. However, they must not dissolve the surface of the layer. Suitable solvents include isopropanol, methyl ethyl ketone and toluene.

When preparing the dispersion, it has proven particularly advantageous to additionally use small amounts of dispersants, such as long-chain phosphates, acrylic acid copolymers and fatty acid salts or fatty acid esters. Amounts of from 1 to 5 parts by weight, based on the inorganic material, are generally sufficient. It is also possible to employ, apart from the dispersant, small amounts of organic polymers, such as polyurethane, vinyl chloride/vinyl acetate copolymers, polyvinylformals, nylons, phenoxy and epoxy resins, and nitrocellulose.

The agglomerate-free dispersions are applied to the surface of the magnetic recording medium in a conventional manner, for example by means of a knife coater, a reverse-roll coater or a kiss coater, but preferably by means of smooth or gravure rollers. After application of the dispersion, the solvent is removed by evaporation.

The novel process does not give a coherent layer on the surface of the magnetic recording medium. Rather, the inorganic particles are preferentially deposited in the pores, valleys and pits in the surface of the magnetic layer. Because they are randomly distributed, they protect the magnetic layer from abrasion by the heads and guide elements. When the surface of the magnetic layer is treated in this manner, the actual magnetic layer is stressed to a lesser extent during use, so that the tape's durability is improved. On the other hand, unlike magnetic layers which contain hard particles in the layer, such a surface treatment of the magnetic layer does not possess the disadvantage of having an abrasive action on the heads.

The surface treatment of the magnetic layer by the process of the invention can be carried out for all types of conventional magnetic recording media, i.e. those comprising a binder layer containing unmodified or modified iron oxides, chromium dioxide or ferromagnetic metal particles, as well as those comprising a thin metal film as the recording layer.

The Examples which follow further illustrate the process according to the invention.

EXAMPLE 1

30 parts of a micronized calcium carbonate having a particle size of from 0.1 to 0.5 $\mu$m, 270 parts of isopropanol and 0.6 part of a dispersant based on a mixture of methylpolyglycol acrylate and methacrylic acid were dispersed for three hours in a pebble mill which had a capacity of 500 ml and contained 350 ml of zirconium oxide-based spheres having a diameter of from 1.0 to 1.5 mm. 80 parts of this dispersion were then finely dispersed in 7920 parts of isopropanol, with vigorous stirring. The resulting dispersion was filtered, applied as a layer to a magnetic tape using a gravure roller, and dried in a tunnel dryer at from 60° to 80° C.

The dynamic friction, expressed as the coefficient of friction $\mu$, of the magnetic tape treated in this manner was then measured.

The coefficient of friction was determined by measuring the tensile force produced by the friction between a moving magnetic tape and a drum rotating at a peripheral speed of 0.5 and 2.4 cm/sec.

The drum was made of steel and had a surface roughness of 0.15 $\mu$m and a diameter of 70 mm. The piece of tape was 25 cm long and was drawn, under a tape tension of 20 cN, over the drum at a velocity of 1 mm/sec, the wraparound angle being 180°. The tensile force exerted on the drum, F, is a measure of the coefficient of friction $\mu$, where $\mu = 1/\pi \times \ln F/20$. The test was carried out at 23° C. and 50% relative humidity. The results are given in the Table.

EXAMPLE 2

The procedure described in Example 1 was followed, except that 4 parts of stearic acid were also added to the dispersion. The test results are shown in the Table.

COMPARATIVE EXPERIMENT

The coefficients of friction of the magnetic tapes used in Examples 1 and 2, which had not been subjected to the novel surface treatment, were determined. The test results are shown in the Table.

TABLE

|  | Coefficient of friction $\mu$ | |
| --- | --- | --- |
|  | at 0.5 cm/sec | at 2.4 cm/sec |
| Example 1 | 0.125 | 0.129 |
| Example 2 | 0.112 | 0.112 |
| Comparative Experiment | blocks | 0.422 |

We claim:

1. A process for improving the abrasion properties and durability of a magnetic recording medium consisting of a nonmagnetic base and a magnetic layer firmly bonded thereto, which comprises: (1) applying a dispersion of inorganic particles having a Mohs' hardness of not less than 5 and a particle size from 0.01 to 3.0 $\mu$m in a solvent, the concentration of the inorganic particles in the dispersion being from 0.02 to 0.25% by weight based on the solvent, to the surface of the magnetic layer, and (2) drying the dispersion to remove the solvent and to deposit the inorganic particles in the pores, valleys and pits in the surface of the magnetic layer.

2. A process as claimed in claim 1, wherein the concentration of the inorganic particles in the dispersion is from 0.02 to 0.1% by weight based on the solvent.

3. A process as claimed in claim 1, wherein the dispersion consists of the inorganic particles, a dispersant, an organic polymer and a volatile solvent.

* * * * *